United States Patent
Shi et al.

(10) Patent No.: US 9,531,275 B2
(45) Date of Patent: Dec. 27, 2016

(54) PRECISE OUTPUT POWER DETECTION

(71) Applicant: Dialog Semiconductor Inc., Campbell, CA (US)

(72) Inventors: Fuqiang Shi, Oak Park, IL (US); David Nguyen, Santa Clara, CA (US); Hien Huu Bui, San Jose, CA (US); Yong Li, San Jose, CA (US); Jianming Yao, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 57 days.

(21) Appl. No.: 14/307,317

(22) Filed: Jun. 17, 2014

(65) Prior Publication Data

US 2014/0376280 A1  Dec. 25, 2014

Related U.S. Application Data

(60) Provisional application No. 61/837,079, filed on Jun. 19, 2013.

(51) Int. Cl.
*H02M 3/335* (2006.01)
*H02M 1/00* (2006.01)

(52) U.S. Cl.
CPC . *H02M 3/33507* (2013.01); *H02M 2001/0009* (2013.01)

(58) Field of Classification Search
CPC ............... H02M 3/33592; H02M 2001/0032; Y02B 70/16
USPC .. 363/20, 21.07, 21.08, 21.12, 21.14, 21.16, 363/21.06
See application file for complete search history.

(56) References Cited

U.S. PATENT DOCUMENTS

| | | | | | |
|---|---|---|---|---|---|
| 4,399,499 | A | * | 8/1983 | Butcher | H02M 3/33576 363/127 |
| 6,972,969 | B1 | * | 12/2005 | Shteynberg | H02M 3/33523 363/21.12 |
| 7,388,764 | B2 | * | 6/2008 | Huynh | H02M 3/33523 363/21.12 |
| 7,558,093 | B1 | * | 7/2009 | Zheng | H02M 3/33515 363/21.12 |

(Continued)

FOREIGN PATENT DOCUMENTS

DE 197 40 932 A1 4/1999

OTHER PUBLICATIONS

German Office Action, German Application No. 102014211722.4, Feb. 20, 2015, 7 pages (with concise explanation of relevance).

(Continued)

*Primary Examiner* — Rajnikant Patel
(74) *Attorney, Agent, or Firm* — Fenwick & West LLP

(57) ABSTRACT

A switching power converter provides regulated output power to a load. The switching power converter comprises a transformer including a primary winding coupled to an input voltage, a secondary winding coupled to an output of the switching power converter, an auxiliary winding on a primary side of the transformer, and a switch coupled to the primary winding of the transformer. Output voltage across the secondary winding is reflected as a feedback voltage across the auxiliary winding. The switching power converter detects output current based on a reset time of the transformer. Based on the detected output power, the switching power converter controls switching of the switch to provide regulated output power.

12 Claims, 4 Drawing Sheets

(56) References Cited

U.S. PATENT DOCUMENTS

| | | | |
|---|---|---|---|
| 8,755,203 B2* | 6/2014 | Li | H02M 3/33507 363/21.13 |
| 2010/0161256 A1 | 6/2010 | Guenther et al. | |
| 2010/0208500 A1* | 8/2010 | Yan | H02M 3/33523 363/21.12 |
| 2011/0063879 A1* | 3/2011 | Murata | H02M 3/33523 363/21.13 |
| 2011/0286248 A1* | 11/2011 | Wang | H02M 3/33507 363/21.18 |

OTHER PUBLICATIONS

Infineon, "TDA16846/TDA16847", ICs for Consumer Electronics, Data Sheet, Munich, Jan. 14, 2000, 28 pages.

* cited by examiner

PRECISE OUTPUT POWER DETECTION

CROSS-REFERENCE TO RELATED APPLICATIONS

This application claims the benefit of U.S. Provisional Patent Application No. 61/837,079, filed Jun. 19, 2013, which is incorporated herein by reference in its entirety.

BACKGROUND

This disclosure relates generally to a switching power supply, and more particularly to power limit detection with primary-side sensing and feedback.

Flyback power converters include a power stage for delivering electrical power from a power source to a load. An example flyback power converter 100 is illustrated in FIG. 1. A switch 102 in the power stage electrically couples or decouples the load 104 to a power source (not shown), and a switch controller 106 coupled to the switch 102 controls the on-time and off-time of the switch 102. The on-time and off-time of the switch 102 may be modified by the controller 106 based upon a feedback signal representing the output power, output voltage, or output current to regulate the same. The energy is stored in the gap of a transformer 108 when the switch 102 is on and is transferred to the load when the switch 102 is off.

The power converter 100 detects output power by measuring the output voltage V_out feeding it back to the primary side controller 106. The output voltage V_out is compared to a reference voltage $V_{REF}$, and the resulting error signal $V_C$ is fed into the controller 106 for controlling the switch 102. Using the output voltage as shown in FIG. 1, the output power $P_O$ is given by:

$$P_O = \frac{1}{2} L_M F_{sw}(EFF)\left(\frac{KV_C}{R_S}\right)^2 \quad (1)$$

where $L_M$ is the magnetizing inductance of the transformer 108, $F_{sw}$ is the switching frequency of the switch 102, EFF is the operational efficiency of the power converter 100, and K is a constant. The magnetizing inductance $L_M$ and operational efficiency EFF can vary widely between power converters, and $V_C$ varies as a function of the load.

FIG. 2 illustrates output power detected by the converter 100 across a range of output voltages. $P_{out}$ upper bound 202 and $P_{out}$ lower bound 204 represent, respectively, high and low boundaries for the output power based on the range of possible values of $L_M$, $V_C$, and EFF. In particular, the power limit detection range 208 indicates a range of possible values of the detected output power at a given power limit threshold voltage 206. As shown in FIG. 2A, the power limit detection range 208 of the converter 100 is large, meaning that the precision at which the converter 100 determines the output power is low.

FIG. 3 illustrates a number of design considerations when a power converter has a power limit detection range with a wide variance. A power converter is typically designed to operate within a normal operating range 310, which includes levels of output power below a maximum rated power threshold 311. If the normal operating power range 310 overlaps with the minimum power limit detection threshold 215, the output power detected by the power converter 100 may cause a false power limit trigger. To prevent overlap between the normal operating power range 310 and the power limit detection threshold 215, a small operating margin 312 is designed between the normal operating range 310 and the power limit detection range 208. This increases the difference between the maximum rated power threshold 311 and the maximum power limit detection point 217. However, the power converter 100 may operate above the maximum rated power threshold 311 for short periods of time. Accordingly, to prevent thermal damage to the converter 100, the converter 100 is designed to operate up to the maximum power limit detection point 217. Because the range from the maximum rated power threshold 311 to the maximum power limit detection point 217 is large, the thermal design and operational ratings of components of the power converter are overdesigned to achieve safe operational modes up to the maximum power limit detection point 217.

SUMMARY

Embodiments described herein include a system and method for sensing output power of a switching power converter. The switching power converter comprises a transformer including a primary winding coupled an input voltage, a secondary winding coupled to an output of the switching power converter, and an auxiliary winding on a primary side of the transformer. A switch is coupled to the primary winding of the transformer. Current in the primary winding is generated responsive to the switch being turned on and not generated responsive to the switch being turned off. Output voltage across the secondary winding is reflected as feedback voltage across the auxiliary winding during off-cycles of the switch. An output power detector detects output current of the switching power converter based on a reset time of the transformer. The output power detector generates a control signal indicating the output power and provides the control signal to a controller, which is configured to control switching of the switch to regulate the output power.

By detecting the output power of the switching power converter using the feedback voltage on the primary side of the transformer, the switching power converter detects the output power more precisely than methods that depend on knowledge of the input voltage to the power converter of magnetizing inductance of the transformer. Accordingly, embodiments of the switching power converter provide power output to a load above a power limit of the switching power converter or the load.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of various embodiments can be readily understood by considering the following detailed description in conjunction with the accompanying drawings.

DETAILED DESCRIPTION OF EMBODIMENTS

The figures and the following description relate to various embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments of switching power converters described herein are configured to sense output power using primary-side voltage feedback. By detecting output power based on primary-side feedback, various embodiments of switching power converters described herein detect power output more precisely than methods relying on representations of factors that can vary widely between power converters, including, for example, magnetizing inductance of transformers included in the power converters.

Figure 1:
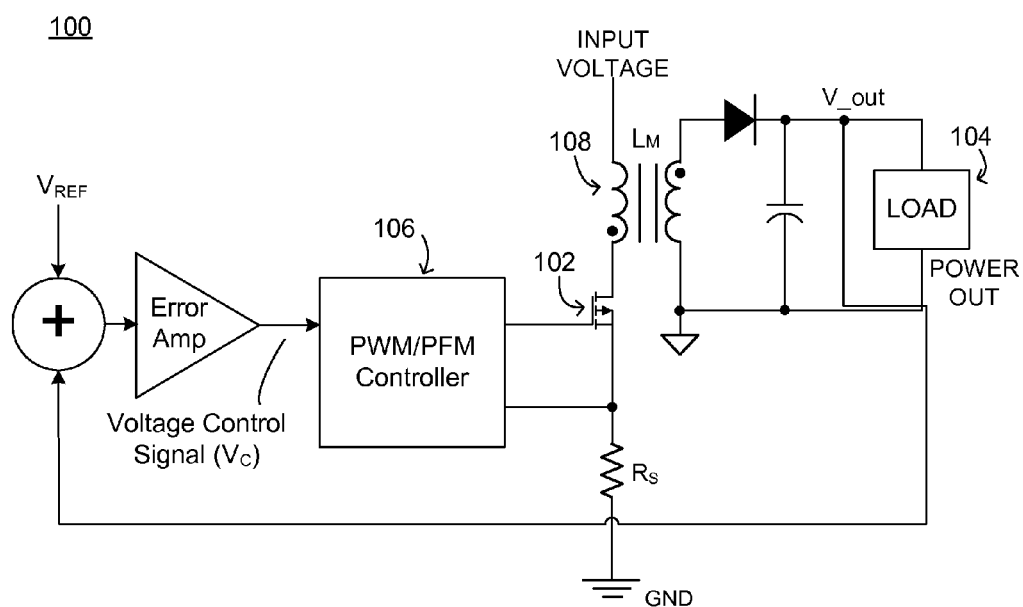
FIG. 1 illustrates an example flyback power converter.
Figure 2:
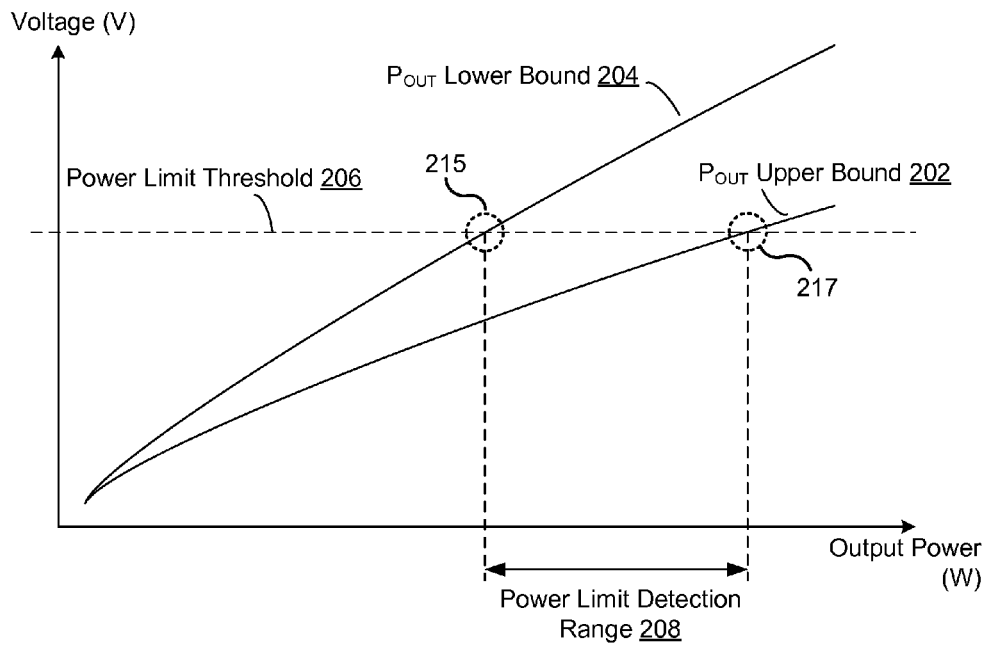
FIG. 2 illustrates example output power levels detected by the example flyback power converter.
Figure 3:
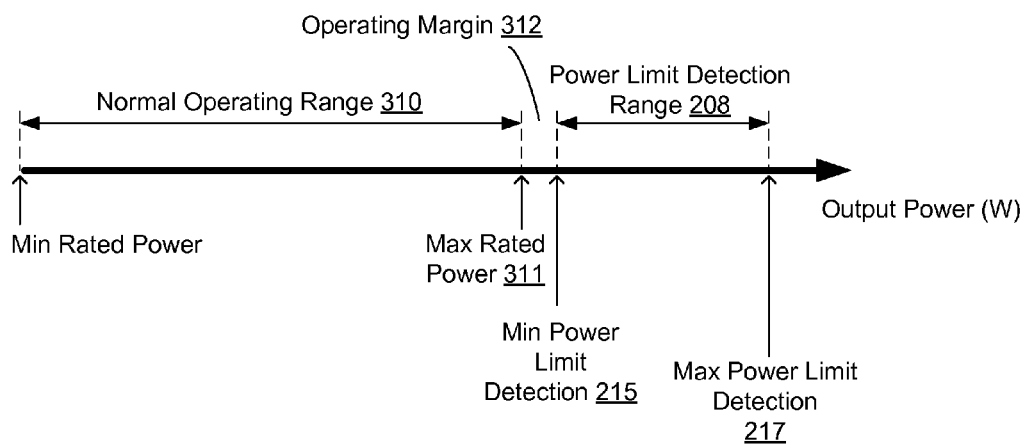
FIG. 3 illustrates example power output ranges for the example flyback power converter.
Figure 4:
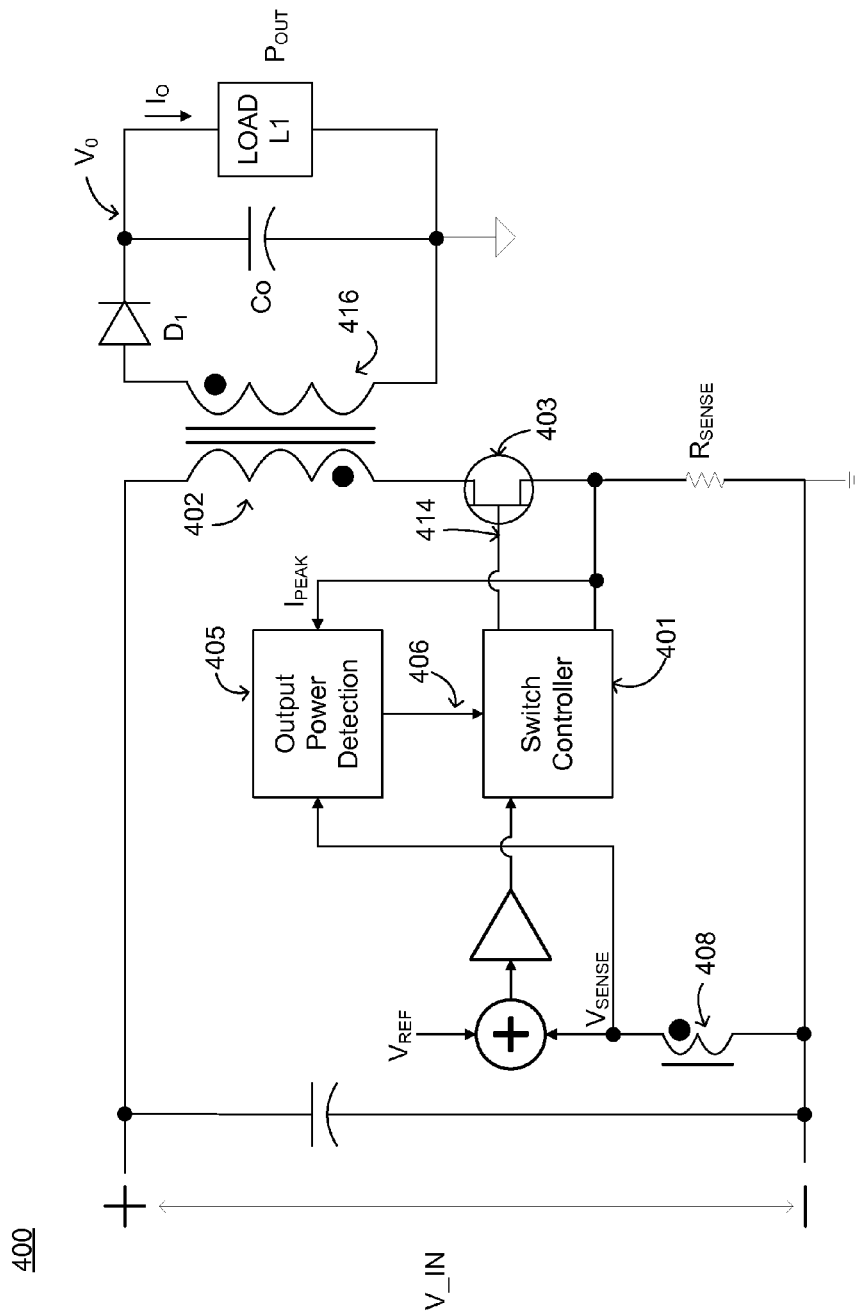
FIG. 4 illustrates one embodiment of a switching power converter with primary-side power detection.

FIG. 4 illustrates one embodiment of a switching power converter 400 with primary-side power detection. The switching power converter 400 includes, among other components, a transformer with primary winding 402, secondary winding 416, auxiliary winding 408, switch 403, switch controller 401, and an output power detection circuit 405.

Power converter 400 receives AC power from an AC power source (not shown), which is rectified to provide the regulated DC input voltage V_IN. Input voltage V_IN is coupled to primary winding 402. During ON cycles of switch 403, energy is stored in primary winding 402 because the diode $D_1$ is reverse biased. The resistor $R_{SENSE}$ senses a primary-side peak current $I_{PEAK}$ during ON cycles of switch 403 in the form of a voltage across the resistor $R_{SENSE}$. The energy stored in primary winding 402 is released to secondary winding 416 and transferred to the load L1 across the capacitor $C_O$ during the OFF cycles of switch 403 because the diode $D_1$ becomes forward biased. Diode $D_1$ rectifies the output voltage on the secondary winding 416 and capacitor $C_o$ filters the output voltage on the secondary winding 416 for outputting as output voltage 412 across load L1. During the OFF cycles of switch 403, output voltage $V_O$ is reflected as feedback voltage $V_{SENSE}$ across auxiliary winding 408.

The output power detection circuit 405 determines a power output $P_{out}$ across load L1 using the primary side current $I_{PEAK}$ and feedback voltage $V_{SENSE}$. Using $I_{PEAK}$, output power detection circuit 405 determines average output current $I_0$ during OFF cycles of switch 403. In one embodiment, output power detection circuit 405 determines the average output current $I_0$ by the following equation:

$$I_0 = \frac{1}{2} I_{PEAK} \left( \frac{t_{rst}}{t_p} \right) N_{ps} \quad (2)$$

where $N_{ps}$ is the turns ratio of the primary winding 402 to the secondary winding 416. $I_{PEAK}$ is the peak current value of primary switch during ON time. The value $t_{rst}$ is the reset time of the secondary winding 416, which corresponds to the duration of the current pulse on the secondary side of the transformer. One measurement of $t_{rst}$ is the time duration from the falling edge of primary current $I_{PEAK}$ to the falling edge of the voltage $V_{SENSE}$ across the auxiliary winding 408. The value $t_p$ is the period of the switching cycle, or the sum of the ON time and the OFF time of switch 403. Using the determined output current $I_0$, the output power detection circuit 405 determines the output power $P_{out}$ by the equation $P_{out} = V_0 \times I_0$ and generates a control signal 406 representing the determined output power.

Primary-side switch controller 401 receives the control signal 406 indicative of output power $P_{out}$ from the output power detection circuit 405 and regulates switching of the switch 403 based at least in part on control signal 406. Switch controller 401 generates a control signal 414 to turn on or turn off switch 403 to regulate output voltage $V_0$ and output current $I_0$. Switch controller 401 can employ any one of a number of modulation techniques, such as pulse-width-modulation (PWM) or pulse-frequency-modulation (PFM), to control the ON and OFF states and duty cycles of switch 403 based on the feedback voltage $V_{SENSE}$ for regulating output power $P_{out}$.

In one embodiment, the switch controller 401 is configured to control switching of the switch 403 to maintain the output power $P_{out}$ at a desired level. For example, when operating at a constant output voltage, the switch controller 401 controls the switch 403 to increase or decrease the current through the load to achieve a desired output power $P_{out}$. In one embodiment, the switch controller 401 controls switching of the switch 403 independently of a representation of the magnetizing induction of the transformer.

Figure 5A:
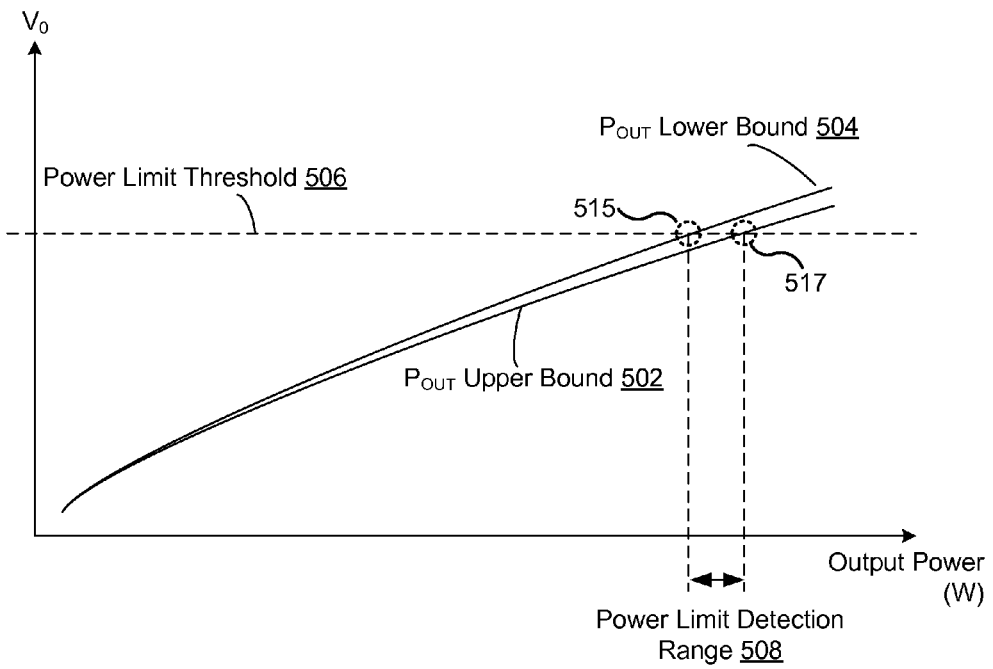
FIG. 5A illustrates output power detected by a switching power converter with primary-side power detection.

By detecting output power $P_{out}$ using primary-side feedback, the output power detection circuit 405 detects $P_{out}$ more precisely than by methods that depend on knowledge of the input voltage to the power converter 400 or the magnetizing inductance of the transformer. FIG. 5A illustrates output power detected by the detection circuit 405 across a range of output voltages $V_0$. $P_{out}$ upper bound 502 and $P_{out}$ lower bound 504 represent, respectively, high and low boundaries for the output power level detected by the output power detection circuit 405. That is, for a given output voltage $V_0$, the output power detection circuit 405 detects output power within the tolerance indicated by the upper bound 502 and the lower bound 504. For example, given a power limit threshold voltage 506, the output power detection circuit 405 detects the power output from the power converter 400 within the power limit detection range 508 between a lower power level detection limit 515 and an upper power level detection limit 517. The power limit threshold voltage 506 indicates a voltage rating for the power converter 400 or the load driven by the power converter 400. For example, thermal design of the power converter 400 or the load is based on the power converter 400 delivering output voltages below the power limit threshold 506.

Figure 5B:
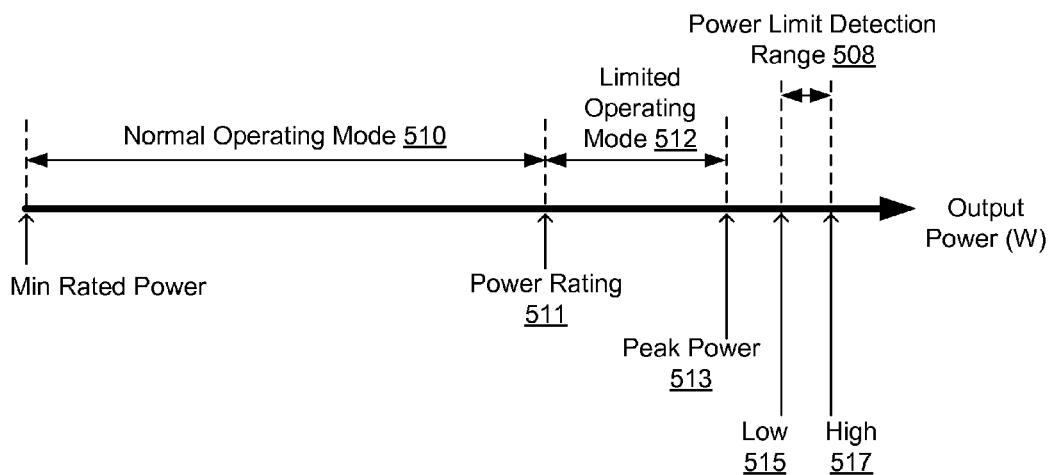
FIG. 5B illustrates example power output ranges from a switching power converter with primary-side power detection.

FIG. 5B illustrates example power output ranges from the power converter 400 according to various embodiments described herein. The example power output ranges shown in FIG. 5B represent various power outputs of the power converter 400 at a constant voltage, such as the power limit threshold voltage 506. The normal operating mode 510, spanning a range of power outputs below a power rating 511, represents power levels at which the power converter 400 or the load L1 can safely operate for extended periods of time. The power rating 511 represents thermal design and an operational rating of the power converter 400 or the load L1. However, for short periods of time, the power converter 400 can operate in a limited operating mode 512, extending from the power rating 511 to a peak power level 513. The peak power level 513 represents an upper boundary on the operating range of the power converter 400 or the load L1. For example, the peak power level 513 is specified by a manufacturer of the load L1 as an upper boundary on the power drawn by the load L1. Since the power limit detection range 508 is above the peak power level 513, the power converter 400 can safely operate in the limited operating module 512 even though the power converter 400 or the load L1 is designed to operate at the power rating 511.

In one embodiment, the switch controller 401 monitors an amount of time the power output of the power converter 400 is above the power rating 511. For example, the switch controller 401 initiates a timer when the output power crosses from the normal operating mode 510 to the limited operating mode 512. If the amount of time the power converter 400 operates in the limited operating mode 512 exceeds a time or duty cycle threshold, the switch controller 401 detects a fault condition. In response, the switch controller 401 reduces the output power delivered to the load to reduce component stress and thermal runaway.

Due to its relatively small power limit detection range, the power converter 400 described herein can be used to deliver power to loads near the power limit threshold of the loads. When driving loads at power levels near the power limit threshold, a precise power level detection is important to avoid thermal damage to the load. In one embodiment, the power converter 400 is incorporated into a power supply designed to operate at or above rated power levels for short periods of time. For example, the power converter 400 is used to provide power to a printer. During a printing task, the printer can occasionally work in the limited operating mode 512 for a short time duration, drawing power that exceeds the power rating 511 but within peak power 513. Since the limited operating module 512 is below the power limit detection range 508, the thermal design of the printer may be rated for operation at the power rating 511 and still be safely operated for short periods of time in the limited operating module 512.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:

1. A switching power converter comprising:
   a transformer including a primary winding coupled to an input voltage, a secondary winding coupled to an output of the switching power converter, and an auxiliary winding on a primary side of the transformer, output voltage across the secondary winding being reflected as feedback voltage across the auxiliary winding;
   a switch coupled to the primary winding of the transformer, current in the primary winding being generated responsive to the switch being turned on and not generated responsive to the switch being turned off, the feedback voltage being generated across the auxiliary winding during off-cycles of the switch;
   an output power detector configured to detect output current of the switching power converter based on a reset time of the transformer and generate a control signal indicating output power of the switching power converter based on the detected output current and the feedback voltage; and
   a controller coupled to the switch, the controller configured to control switching of the switch based on the control signal indicating the output power of the switching power converter to regulate the output power of the switching power converter and deliver the output power above a power limit to a load.

2. The switching power converter of claim 1, wherein the output power detector is configured to detect the output current by:
   detecting the reset time of the transformer using the feedback voltage across the auxiliary winding.

3. The switching power converter of claim 2, wherein detecting the reset time of the transformer comprises:
   detecting a current on the primary side of the transformer during on-cycles of the switch;
   detecting a time between a falling edge of the primary-side current and a falling edge of the feedback voltage across the auxiliary winding; and
   determining the reset time of the transformer as the detected time.

4. The switching power converter of claim 2, wherein the output power detector is configured to detect the output current based on a ratio of the reset time of the transformer to a period of a switching cycle of the switch.

5. The switching power converter of claim 1, wherein the controller is further configured to:
   monitor an amount of time the power delivered to the load is above the power limit; and
   generate a fault condition responsive to the amount of time exceeding a time threshold.

6. The switching power converter of claim 5, wherein the controller is further configured to reduce the output power of the switching power converter in response to generating the fault condition.

7. A method for controlling a switching power converter, the switching power converter including a transformer with a primary winding coupled to an input voltage, a secondary winding coupled to an output of the switching power converter, an auxiliary winding on a primary side of the transformer, and a first switch coupled to the first primary winding of the transformer, output voltage across the secondary winding being reflected as feedback voltage across the auxiliary winding, the method comprising:

detecting output current of the switching power converter based on a reset time of the transformer;

generating a control signal indicating the output power of the switching power converter based on the detected output current and the feedback voltage; and controlling switching of the switch based on the control signal indicating the output power of the switching power converter to regulate the output power of the switching power converter and deliver the output power above a power limit to a load.

8. The method of claim 7, wherein detecting the output current comprises:

detecting the reset time of the transformer using the feedback voltage across the auxiliary winding.

9. The method of claim 8, wherein detecting the reset time of the transformer comprises:

detecting a current on the primary side of the transformer during on-cycles of the switch;

detecting a time between a falling edge of the primary-side current and a falling edge of the feedback voltage across the auxiliary winding; and determining the reset time of the transformer as the detected time.

10. The method of claim 8, wherein the output current is detected based on a ratio of the reset time of the transformer to a period of a switching cycle of the switch.

11. The method of claim 7, further comprising:

monitoring an amount of time the power delivered to the load is above the power limit; and generating a fault condition responsive to the amount of time exceeding a time threshold.

12. The method of claim 11, further comprising reducing the output power of the switching power converter in response to generating the fault condition.

* * * * *